United States Patent
Chou et al.

[11] Patent Number: 6,163,402
[45] Date of Patent: Dec. 19, 2000

[54] REAR PROJECTION SCREEN

[75] Inventors: Hsin-Hsin Chou, Woodbury; Patrick A. Thomas, Maplewood; Colleen M. Brenner-Watschke, St. Paul; Jeffrey C. Chang, North Oaks; Robert M. Moshrefzadeh, St. Paul, all of Minn.

[73] Assignee: 3M Innovative Properties Company, St. Paul, Minn.

[21] Appl. No.: 09/095,835

[22] Filed: Jun. 11, 1998

[51] Int. Cl.[7] .................................................. G03B 21/60
[52] U.S. Cl. .......................... 359/443; 359/454; 359/460; 353/74
[58] Field of Search ..................... 359/494, 452, 359/599, 453, 454, 456, 443, 460, 492; 349/96; 353/74

[56] References Cited

U.S. PATENT DOCUMENTS

| Re. 28,634 | 12/1975 | DePalma | 350/126 |
|---|---|---|---|
| 2,287,556 | 6/1942 | Land | 38/24 |
| 2,380,241 | 7/1945 | Jelley et al. | 88/28.93 |
| 3,388,027 | 6/1968 | Altman | 161/4 |
| 3,609,000 | 9/1971 | Miyano et al. | 350/126 |
| 3,712,707 | 1/1973 | Henkes, Jr. | 350/122 |
| 4,083,626 | 4/1978 | Miyahara et al. | 350/117 |
| 4,165,153 | 8/1979 | Land | 350/126 |

(List continued on next page.)

FOREIGN PATENT DOCUMENTS

| 269324 | 11/1987 | European Pat. Off. | C08F 265/04 |
|---|---|---|---|
| 342283 | 11/1989 | European Pat. Off. | C08L 101/00 |
| 783 133 | 7/1997 | European Pat. Off. | G03B 21/60 |
| 807849 | 11/1997 | European Pat. Off. | |
| 19627105 | 7/1995 | Germany. | |
| 10003125 | 7/1984 | Japan. | |
| 1-47308 | 10/1989 | Japan. | |
| 4-324848 | 11/1992 | Japan. | |
| 6-059107 | 3/1994 | Japan. | |
| 6067308 | 3/1994 | Japan | G02B 21/62 |
| 7-216328 | 8/1995 | Japan. | |
| 9160132 | 12/1995 | Japan. | |
| 9265004 | 3/1996 | Japan. | |
| 9325426 | 5/1996 | Japan. | |
| 08339036 | 12/1996 | Japan. | |
| 9-114001 | 5/1997 | Japan. | |
| 9127314 | 5/1997 | Japan. | |
| 9197109 | 7/1997 | Japan. | |
| 10-3125 | 1/1998 | Japan | G03B 21/62 |
| 97009321 | 7/1995 | Rep. of Korea. | |
| WO 93/15585 | 8/1993 | WIPO | H04N 5/74 |
| WO 96/31803 | 10/1996 | WIPO | G03B 21/62 |
| WO 97/01610 | 1/1997 | WIPO | C09J 7/02 |

OTHER PUBLICATIONS

Goldenberg et al., "Diffraction analysis of bulk diffusers for projection–screen applications", J. Opt. Soc. Am., vol. 2, No. 12, Dec., 1985.

(Anonymous), "Rear projection screen for LCD projection", Research Disclosure, Jul. 1994, pp. 341.

Eliyahu et al., "Angular intensity and polarization dependence of diffuse transmission through random media", J. Opt. Soc. Am., vol. 10, No. 3, Mar., 1993.

Primary Examiner—David M. Gray
Assistant Examiner—E P Leroux
Attorney, Agent, or Firm—William D. Miller

[57] ABSTRACT

A rear projection screen assembly is described that includes a diffuser and a polarizer. The diffuser has particles dispersed within a binder. The particles and the binder have different refractive indices and are chosen such that the diffuser spreads light of an initial polarization state a cone of angles while substantially preserving the initial polarization state of the light. The diffuser also substantially depolarizes a portion of the light that is laterally scattered in the diffuser. The polarizer is disposed to receive light transmitted through the diffuser. The polarizer transmits light of the initial polarization state while absorbing a portion of the laterally scattered light that has a different polarization state. The resolution of the overall screen assembly may be made higher while also improving other characteristics of the screen assembly.

16 Claims, 15 Drawing Sheets

U.S. PATENT DOCUMENTS

| | | | |
|---|---|---|---|
| 4,184,745 | 1/1980 | Land | 350/126 |
| 4,268,127 | 5/1981 | Oshima et al. | 350/337 |
| 4,472,708 | 9/1984 | Anderson | 340/783 |
| 4,566,756 | 1/1986 | Heijnemans | 350/126 |
| 4,679,900 | 7/1987 | McKechnie et al. | 350/126 |
| 4,730,897 | 3/1988 | McKechnie et al. | 350/128 |
| 4,773,731 | 9/1988 | Goldenberg et al. | 350/128 |
| 5,111,110 | 5/1992 | Houben | 315/10 |
| 5,307,205 | 4/1994 | Ludwig, Jr. et al. | 359/453 |
| 5,473,454 | 12/1995 | Blanchard | 359/69 |
| 5,594,561 | 1/1997 | Blanchard | 349/59 |
| 5,607,764 | 3/1997 | Konno et al. | 428/327 |
| 5,629,784 | 5/1997 | Abileah et al. | 349/112 |
| 5,751,388 | 5/1998 | Larson | 349/96 |
| 5,751,478 | 5/1998 | Yoshimura et al. | 359/453 |

REAR PROJECTION SCREEN

BACKGROUND

This invention relates generally to transmissive screens, and more particularly to transmissive screens suitable for use in rear projection systems.

Rear projection screens are generally designed to transmit an image projected onto the rear of the screen into a viewing space. The viewing space of the projection system may be relatively large (e.g., rear projection televisions), or relatively small (e.g., rear projection data monitors). The performance of a rear projection screen can be described in terms of various characteristics of the screen. Typical screen characteristics used to describe a screen's performance include gain, viewing angle, resolution, contrast, the presence of undesirable artifacts such as color and speckle, and the like. It is generally desirable to have a rear projection screen that has high resolution, high contrast and a large gain. It is also desirable that the screen spread the light over a large viewing space. Unfortunately, as described more fully below, as one screen characteristic is improved, one or more other screen characteristics often degrade. For example, in order to increase the screen gain using the same overall structure, one must decrease the viewing angle over which the screen is readily observable. As a result, certain tradeoffs are made in screen characteristics and performance in order to produce a screen that has overall acceptable performance for the particular rear projection display application.

Rear projection display applications requiring high resolution are becoming more prominent. For example, high definition and digital television formats have relatively high resolution requirements. As a result, screens used in such rear projection televisions must be able to resolve the higher resolution images. Rear projection desktop data monitors also have high resolution requirements. As typical rear projection screens are modified to accommodate the higher resolution, the above-described tradeoffs tend to degrade other performance characteristics of the screen. Thus, there remains a need for screens that have improved the overall performance while meeting the minimum performance criteria necessary for the rear projection display application in which the screen is used.

SUMMARY

Generally, the present invention relates to rear projection screen assemblies. In one particular embodiment, the screen assembly includes a diffuser and a polarizer. The diffuser has particles dispersed within a binder. The particles and the binder have different refractive indices and are chosen such that the diffuser spreads light of an initial polarization state into a cone of angles while substantially preserving the initial polarization state of the light. The diffuser also substantially depolarizes a portion of the light that is laterally scattered in the diffuser. The polarizer is disposed to receive light transmitted through the diffuser. The polarizer transmits light of the initial polarization state while absorbing a portion of the laterally scattered light that has a different polarization state.

In another embodiment of the invention a diffuser and polarizer are combined in a screen assembly in a manner such that the modulation depth of diffused light exiting the diffuser is less than the modulation depth of the diffused light after it is transmitted through the polarizer. In such an embodiment, the resolution of the overall screen assembly may be made higher while also improving other characteristics of the screen assembly.

In still another embodiment, a screen assembly including a diffuser and a polarizer can be made which has overall high-performance screen characteristics. Such a screen may have a gain of at least about 0.5, exhibit slight or no scintillation, have a viewing angle of at least 50 degrees and a modulation depth of at least about 0.80.

In still another embodiment, the screen assembly includes a diffuser having particles dispersed in a binder, a polarizer laminated to the diffuser, a glass sheet laminated to the polarizer on the viewer side of the screen assembly and an anti-reflective coating the outside of the glass sheet. The screen assembly may have a viewing angle of at least about 65 degrees, a peak gain of at least about 0.65 and a modulation depth of at least about 0.90. The screen assembly may further have, at most, only slight observable scintillation.

An improved projection system is provided in still another embodiment of the invention. The projection system includes a projector used to generate a polarized image made up of pixels. A bulk diffusing element is disposed to receive and diffuse the projected image to a prescribed viewing angle. The diffusing element maintains the polarization state of light corresponding to a projected pixel of the image as the light is transmitted through the diffuser at a location corresponding to the projected pixel to a greater extent than it maintains the polarization state of light corresponding to the projected pixel that is laterally scattered by the diffuser such that it exits the diffuser at a location corresponding to a different pixel. The system also includes an absorbing polarizer following the diffuser in the light path. The polarizer is oriented so as to pass the light corresponding to the projected pixel that transmits through the diffuser at the location corresponding to the projected pixel.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

DETAILED DESCRIPTION

The present invention is generally applicable to a number of different screen assemblies and is particularly suited to screen assemblies used in rear projection systems. While specific examples of such screen assemblies are provided below to facilitate explanation of various aspects of the invention, it is not intended that the invention be limited to the specifics of the examples.

Figure 1:
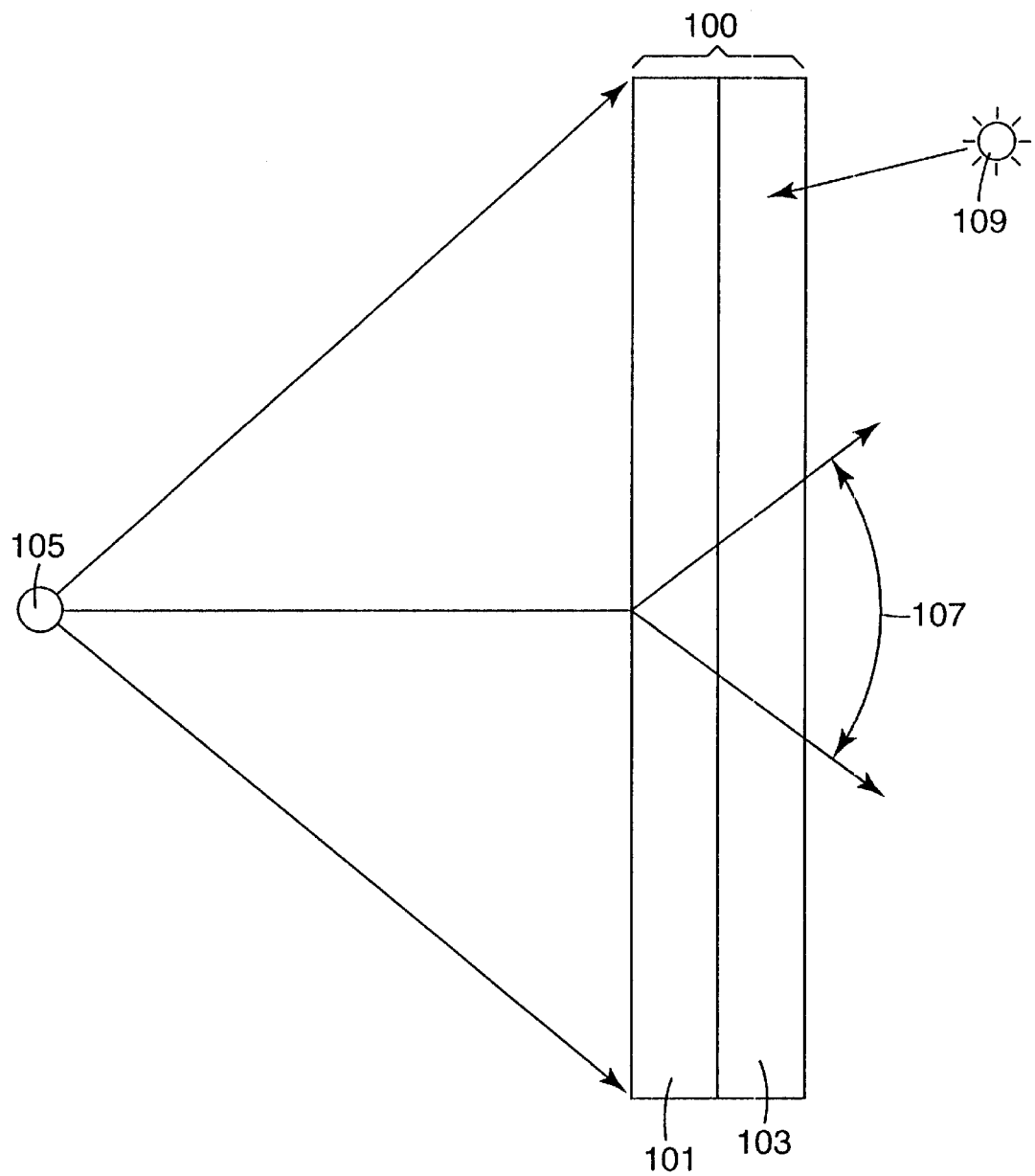
FIG. 1 illustrates a projection screen assembly in accordance with one embodiment of the invention.

With reference to FIG. 1, a rear projection screen 100 in accordance with one particular embodiment of the present invention will be described. The rear projection screen 100 includes a diffusing element 101 and an absorbing polarizer element 103. As will be described more fully below, the diffusing element 101 spreads the light of a polarized image projected from a projector 105 and incident on the rear of the screen 100 to a desired viewing angle 107 on the viewing side of the screen. The viewing angle may be either symmetric or asymmetric depending on the desired application. The absorbing polarizing element 103 serves a number of functions as described more fully below. One function of the absorbing polarizing element 103 is to improve the contrast of the screen 100 when the screen 100 is used in the presence of ambient light 109. The contrast is improved by absorbing a portion of the ambient light incident on the viewer side of the screen (which is unpolarized) that would otherwise be reflected by the screen and reduce the image contrast. The pass direction of the polarizing element 103 is aligned with the polarization direction of the projected image in order to minimize any absorption of the projected image by the polarizing element 103. As will be appreciated, absorbing approximately half of the ambient light without significantly absorbing the image transmitted through the screen assembly 100 enhances the contrast of the screen when measured in the presence of ambient light.

As discussed below, the amount of image light absorbed by the polarizing element 103 depends in part on the polarization preserving capability of the screen. Thus, it is generally desirable to use a diffusing element 101 that does not significantly depolarize the image light as it is diffused by and transmitted through the diffuser element 101. In one embodiment, a polarization-preserving bulk diffuser is used which is comprised of particles dispersed within a binder. The type of particles used and the manner in which they are dispersed in the binder each have an effect on the polarization-preserving characteristic of the diffuser. To achieve good polarization preservation, its is generally desirable that the particles be spherical, that the diffuser be thin and that the particle loading in the binder be low. Diffuser thickness and particle loading also affect the gain and viewing angle of the diffuser and such affects must be taken into account when designing the diffuser.

As further described below, the diffuser element 101 and absorbing polarizing element 103 are advantageously combined together in a manner which permits the overall characteristics of the screen to be improved. In accordance with one embodiment of the invention, it has been recognized that the diffusing element 101 may be chosen to preferentially depolarize certain light. When the preferentially depolarized light is light that would otherwise degrade the image (e.g., because it has been laterally scattered from an adjacent pixel), the amount of such light reaching the viewing side of the screen assembly 100 is significantly reduced due to substantial absorption by the polarizing element 103. Moreover, as further described below, preferential depolarization and absorption of the undesirable light transmitted through the screen assembly relaxes constraints that would otherwise be imposed on the screen to prevent image degradation by the undesirable light. The relaxed constraint can be used to improve other characteristics of the screen.

The screen assemblies of the present invention are particularly suited for use in projection systems that utilize a polarized image source. In accordance with one embodiment of the invention, a liquid crystal display (LCD) based projector, for example, can be used in a projection system to project a polarized image onto a screen assembly of the type described in the present application. The projection system may vary in size from relatively small data monitors, to large screen TVs and video walls. The projection system may also rely on a folded image projection path such as the various projection systems described in European patent application EP 783133 entitled "Projecting Images", the contents of which are incorporated herein by reference. As will be appreciated from the description below, such systems are particularly benefited by the use of the various screen assemblies described herein. Where the projection system uses a polarization sensitive mirror as described in EP 783133, the addition of the absorbing polarizer used in the screen assembly further enhances the performance of the projection system. The absorbing polarizer of the screen assembly may also serve as a clean-up polarizer for other components in a projection system including, for example, imagers (e.g., LCD), polarization sensitive beamsplitters and mirrors, retarders and the like.

To facilitate a further understanding of how the diffusing element and the absorbing polarizing element can be combined in manner that permits screen assemblies to be made that have better performance characteristics, a more detailed description of the various screen characteristics is provided below. One important screen characteristic is gain. The gain of a screen is a representation of the screen's brightness as a function of viewing angle. Calibration of gain is typically done using an ideal Lambertian reflector with the gain of the ideal Lambertian standard set at 1 for all angles. The peak gain of a screen (or screen element) corresponds to the highest gain at some angle. The peak gain of a bulk diffuser screen, for example, will be typically observed for light transmitted through the screen at an angle normal to the surface of the screen.

Another important screen characteristic is viewing angle. The viewing angle of a screen, as used herein, is the angle at which the gain of the screen drops to half of the peak gain. In a screen that uses bulk diffusion to spread the light over a desired viewing angle, the viewing angle will typically correspond to the angle at which the intensity of the transmitted image drops to half of the intensity of light transmitted normal to the screen surface.

Another measure of screen performance is contrast. Contrast is generally the ratio of luminance of a projected white image to that of a projected black image. As such, numerical contrast numbers are dependent on the light source and the imaging optics. The contrast ratio tends to increase with increasing screen brightness and as the projected black image is made blacker. In one instance, contrast may be represented in terms of the dynamic range of the system. The dynamic range is a measure of the contrast ratio in the absence of ambient light. When a projection display is used in the presence of ambient light, some of the ambient light may be reflected from the screen. The reflected light typically includes both specular and diffuse components. The reflection tends to decrease the contrast of the screen. Thus, if the screen is used in the presence of ambient light, the contrast ratio is also dependent upon the ability of the screen to absorb ambient light. As diffuse reflection by the screen tends to contribute more to a reduction in contrast of the screen, it is particularly desirable to reduce the amount of diffuse reflection from the screen. The amount of diffuse reflectance provides another useful measure of screen performance.

Another characteristic of a screen is its ability to maintain color and to prevent or minimize introduction of localized color changes or shifts. In certain screens color may be observed as a random pattern of different color pixel-like spots on the screen. Such color artifacts typically results from wavelength-dependent scattering, where wavelengths are scattered in different directions or with different efficiency. As a result of the wavelength dependence of the scattering, different colors may become physically separated and observable on the viewer side of the projection screen. Increasing the thickness of the screen until the observer cannot resolve any color separation can be used to reduce color artifacts on a screen using a bulk diffuser.

Another artifact that may be observed in certain rear projection screens is speckle. Speckle is observed as randomly oriented patterns that appear to move with the slight movement of the eye. Speckle relates generally to coherent interference and is more typically observed when screens are used with high magnification systems in which the projected beam is nearly coherent. Destroying the coherence of the illumination beam may reduce speckle. For example, speckle can be reduced or eliminated by increasing the amount of diffusion and/or the thickness of the diffuser. As described more fully below, increasing the thickness of a diffuser to reduce or eliminate color and speckle may have the disadvantage of decreasing the screen resolution and gain.

Color and speckle artifacts on a screen are often collectively observed as scintillation. In general, color and speckle follow the same trend (e.g., speckle reduces as the amount of color is reduced). One way to quantify scintillation is to measure the brightness uniformity on a pixel size level. The non-uniformity resulting from scintillation can be expressed in terms of the standard deviation. The presence of scintillation can also be expressed qualitatively. Qualitative evaluation is important since the eye is able to efficiently detect scintillation. The following Table I represents a convenient way to characterize scintillation.

TABLE I

| Rating | Qualitative | Standard Deviation |
|--------|-------------|--------------------|
| 0 | None | <2.5 |
| 1 | Slight | 2.5–4.5 |
| 2 | Medium | 4.5–7.5 |
| 3 | Large | >7.5 |

As noted above, the resolution of the rear projection screen is becoming more important as rear projection display applications require screens with increasingly higher resolution. The resolution of a screen is generally defined as a measure of the finest detail that can be distinguished in an image projected on the screen. One method of measuring resolution is accomplished by projecting an image on the screen representing a series of sets of dark and bright lines at progressively smaller spacing to ascertain the limiting number of lines per millimeter that can be resolved. Using this method the resolution of the screen can be quantified as the ability to resolve horizontal and/or vertical bars at different spatial frequencies.

Figure 2A:
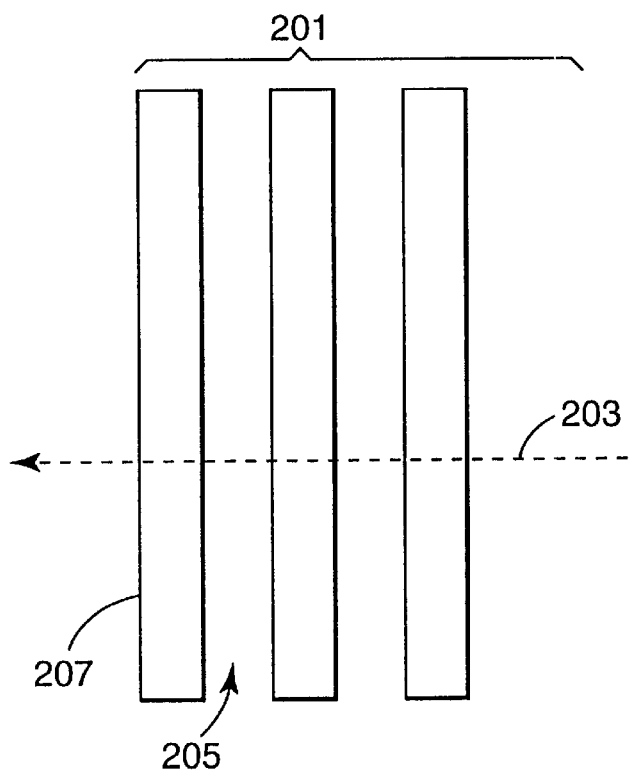
FIGS. 2A–2B depict a mechanism for characterizing resolution of screen assemblies in accordance with an embodiment of the invention.
Figure 2B:
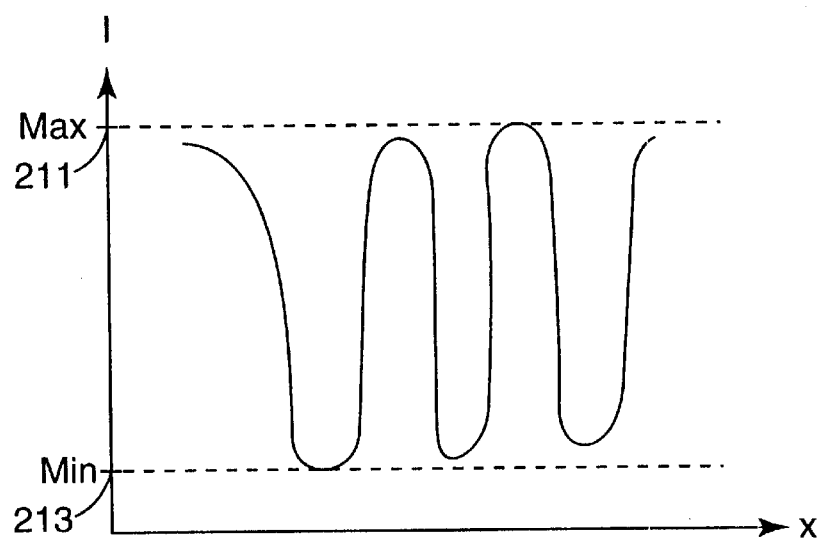

Screen resolution can be quantified by measuring the modulation depth (MD) depth of the screen in the manner depicted in FIGS. 2A and 2B. As illustrated in FIG. 2A, the modulation depth is measured by examining a pattern 201 of repeating bright 205 and dark 207 images transmitted through the screen. The pattern 201 is scanned along a line 203 orthogonal to the bars. The scan measures the intensity of light as a function of position along the scan line 203. The results of such a scan can be graphically represented by plotting the intensity as a function of position along the scan line 203 as illustrated in FIG. 2B. The scanned intensities can be used to calculate an intercharacter contrast (ICC) value. ICC is the ratio of intensities according to the relationship:

$$ICC = I_{max}/I_{min},$$

where $I_{max}$ is the maximum intensity 211 of the scan and $I_{min}$ is the minimum intensity 213 of the scan.

The modulation depth of the screen is calculated from the ICC according to the relationship:

$$MD = \frac{ICC - 1}{ICC + 1},$$

which represents a normalized value. As will be appreciated, the modulation depth of any measured element lies between 0 and 1, with 1 being perfect resolution and 0 being an unresolvable image. It will generally be appreciated that the higher the ICC the higher the modulation depth. The modulation depth of a screen assembly provides a particularly useful measure for determining the performance of a screen and for comparing relative performance of different screens and screen elements.

In accordance with one embodiment of the invention, the diffusing element of the screen assembly is a bulk diffuser (e.g., a diffuser that includes scattering particles dispersed in a bulk medium). It is generally difficult to use bulk diffusion to obtain a screen having a relatively wide viewing angle without significantly decreasing the resolution of the screen. One way of increasing the viewing angle of the screen is to make the diffuser thicker. Thicker diffusers also reduce color and speckle as described above. As the diffuser is made thicker, however, a significant portion of light transmitted through the screen is scattered laterally within the screen. A reduction in resolution results when an image made up of pixels is projected through the diffuser in a manner that allows one pixel to be laterally scattered such that it exits the diffuser at a location corresponding to another pixel. This phenomenon is also referred to as blooming. In the pattern illustrated in FIG. 2A, the laterally scattered light is scattered into the region of the dark areas of the pattern 207 increasing the minimum intensity of the scan in that area as well as decreasing the maximum intensity in the bright areas. Thus, as a result of laterally scattered light, the ICC and modulation depth (MD) of the bulk diffuser can be substantially degraded.

One approach to decreasing the amount of resolution degradation associated with laterally scattered light is to provide absorbing particles in the bulk medium of the diffuser. These absorbing particles preferentially absorb the laterally scattered light due to the longer path length of the laterally scattered light in the diffuser. The absorbing particles also absorb, however, a portion of light that is not laterally scattered. This results in a lower gain and diffuse transmission of the screen.

In accordance with one particular embodiment of the present invention, it has been discovered that a diffuser that substantially preserves the polarization of an incident polarized image can be used to simultaneously substantially depolarize the laterally scattered light. When such a diffuser is combined with an absorbing polarizer, the polarizer absorbs a significant portion of the laterally scattered light as a result of the depolarization. Thus, in such a screen assembly, the diffuser can be allowed to have a relatively large amount of laterally scattered light (e.g., the diffuser can be made relatively thick) in order to improve other properties of the screen. While the diffuser by itself may have an unacceptably low modulation depth, when it is combined with the absorbing polarizer in a screen assembly, the overall screen assembly can still have a relatively high modulation depth.

Relaxing the constraints on lateral scattering within the diffuser (i.e., allowing the diffuser to have a relatively large amount of lateral scattering) permits the diffuser to be designed to improve other characteristics. Moreover, because the screen assembly can regain losses in resolution typically introduced by lateral scattering in the diffuser due to the preferential depolarization and absorption of the laterally scattered light, a high-resolution screen can be made in which other characteristics of the screen are enhanced. The relaxation of the constraint on lateral scattering can be described in terms of the difference between the modulation depth of the overall screen assembly and the modulation depth of the diffusing element by itself. In other words, when the diffusing element is examined by itself, it will have a lower modulation depth than the complete screen assembly in which it is incorporated. This is because without absorption of the depolarized light, the laterally scattered light will be visible and reduce the resolution of the diffuser.

A screen assembly in accordance with one embodiment of the present invention can be described as having a diffusing element and an absorbing polarizer, the combination of which has a higher modulation depth than the diffusing element by itself. In other words, the modulation depth of diffused light exiting the diffusing element is less than the modulation depth of the diffused light after transmission through the polarizer. The difference in modulation depth between the diffusing element and the screen assembly will vary depending on the application. The difference may be relatively large as long as the overall modulation depth provides adequate resolution for the screen application. Generally, the larger the modulation depth difference can be, the more freedom one has in improving other characteristics of the screen. Larger modulation depth differences are typically possible while maintaining overall high resolution when the diffusing element efficiently depolarizes the laterally scattered light. In certain instances the modulation depth difference may be larger than about 0.04. In some instances a screen can be made in which the modulation depth difference is greater than about 0.05. The modulation depth difference may be still even larger ranging from about 0.10 to greater than 0.15. Such modulation depth differences can be obtained with an overall modulation depth of at least about 0.70. In certain instances the overall modulation depth may be at least about 0.80. In still other embodiment the overall modulation depth may be higher than about 0.90 to 0.99.

In another embodiment of the invention, a certain amount of laterally scattered light may be absorbed by an absorbing particle dispersed in the binder of the diffuser with an additional portion being depolarized and absorbed by the polarizer. Where the absorbing particles in the diffuser absorbs light of all polarization states, it may also serve to enhance the contrast of the screen assembly while still further enhancing the resolution.

As noted above, relaxing the constraint on lateral scattering in the diffusing element allows the performance of the diffusing element to be improved in other characteristics. For example, consider the interaction between color and speckle and laterally scattered light. One way to reduce lateral scattering is to decrease the thickness of the diffuser element. The level of undesirable color and speckle artifacts, however, increases as the thickness of the diffuser is decreased. When the diffuser is made thicker, speckle reduces because the coherency of the light source becomes ultimately incoherent due to the many scattering instances. Color separations also cannot be resolved in thick diffusers, as the separations become finer. For a given formulation, there exists a minimum thickness, referred to herein as a threshold thickness, above which the diffuser displays no color and negligible or no speckle for a given imaging system. When a diffuser is made thick enough to substantially reduce color and speckle, however, the amount of lateral scattering present in such a diffuser can significantly degrade the diffuser resolution (modulation depth).

In accordance with one aspect of the present invention, the constraint on lateral scattering is relaxed by using a diffuser in which the laterally scattered light is preferentially depolarized and absorbed by the polarizing element of the screen assembly. Relaxing this constraint allows a thicker diffuser to be used. Accordingly, a screen that has a high resolution (MD) can be constructed which also has low color and speckle. By purposefully allowing a significant portion of depolarizing lateral scattering, it is easier to select a formulation at least as thick as the threshold thickness. When the diffusing element, which otherwise substantially preserves polarization of the diffused light, is combined with an absorbing polarizer, it can be used as a rear projection screen to display a high-resolution, artifact-free projected polarized image.

As described above, the relaxed lateral scattering constraint can be used to produce a screen with high resolution (e.g., MD) which has little or no color or speckle. The relaxed constraint can be used, however, to optimize one or more other characteristics of the screen in addition to or instead of color or speckle. FIGS. 3A–3F, depict different relationships between the various screen characteristics, with a particular focus on the relationship between a change in modulation depth (ΔMD) and the screen characteristics. The change in modulation depth (ΔMD) represents the amount by which the modulation depth of the screen assembly including the absorbing polarizer increases over the modulation depth of the diffuser alone. The modulation depth is measured for comparison using the same transmitted luminance for each measurement (e.g., by adjusting the projection source such that the same brightness is transmitted to the viewer side of the screen assembly or component being measured).

FIGS. 3A–3F illustrate trends of the various relationships. The trends correspond to screens having a common general diffuser formulation in which particles were dispersed in a binder. The particles had an approximate diameter of 5 microns and a refractive index of approximately 1.54. The refractive index of the binder was approximately 1.48. The loading of the particles in the binder was approximately 33%. The diffuser was coated on a polycarbonate substrate having relatively low birefringence.

Figure 3A:
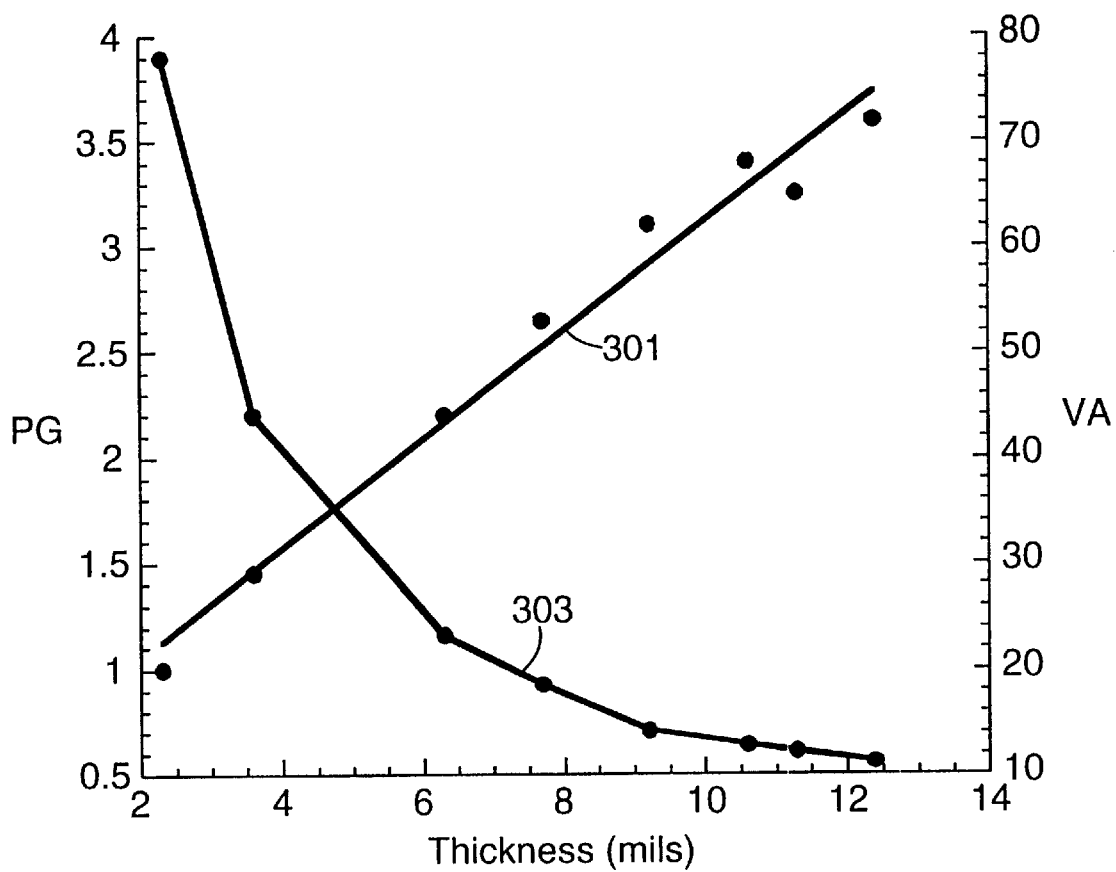
FIGS. 3A–3F are graphs illustrating relationships between various screen characteristics.

FIG. 3A illustrates a curve 301 of peak gain (PG) and a curve 303 of viewing angle (VA), each as a function of diffuser thickness. The illustrated peak gain and viewing angle values are for a diffuser of the type described above combined with a linear polarizer to form a screen assembly.

As the thickness increases the peak gain drops and the viewing angle increases. From these graphs it will be appreciated that as higher viewing angle screens are desired, it may be necessary to make the diffuser thicker. While thicker diffusers tend to have increased lateral scattering, in accordance with one particular embodiment of the present invention high-resolution screens that also have high viewing angles can be made by using an absorbing polarizer to preferentially absorb the laterally scattered light.

Figure 3B:
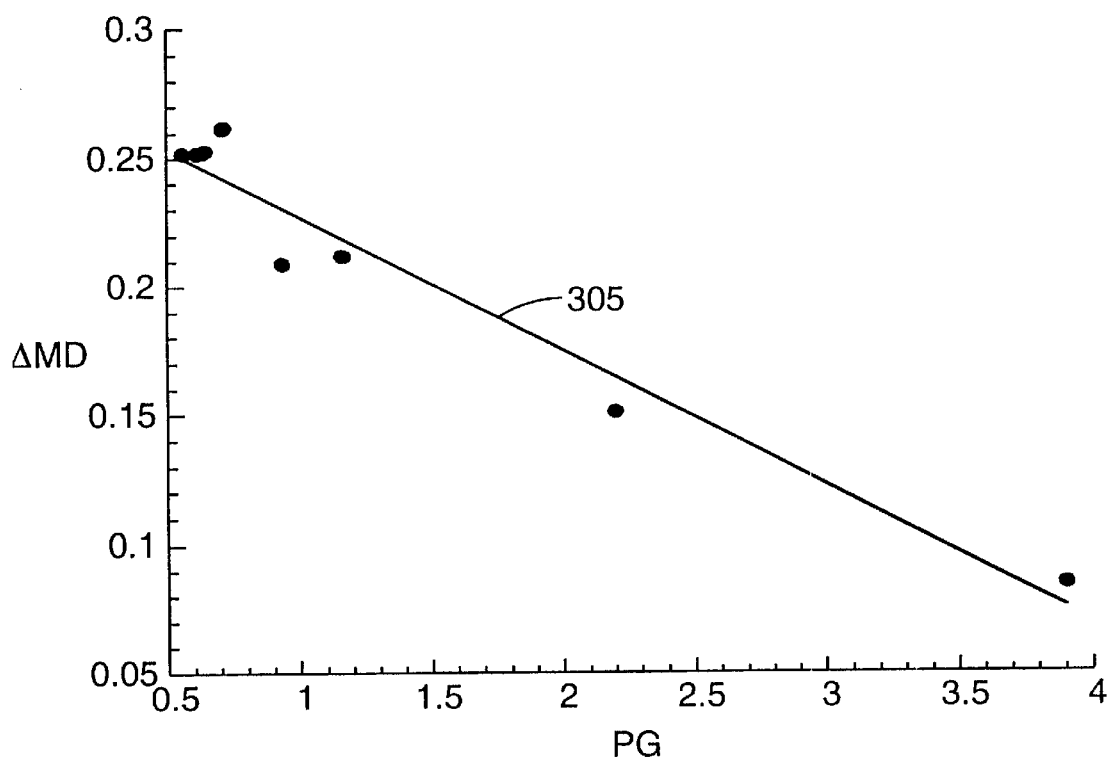

In FIG. 3B, a curve 305 illustrates the relationship between a change in modulation depth (ΔMD) and peak gain. The illustrated data was measured in the presence of an ambient light source of 250 lux. The modulation depth increases for a screen assembly including a linear polarizer since the linear polarizer absorbs much of the incident ambient light.

Figure 3C:
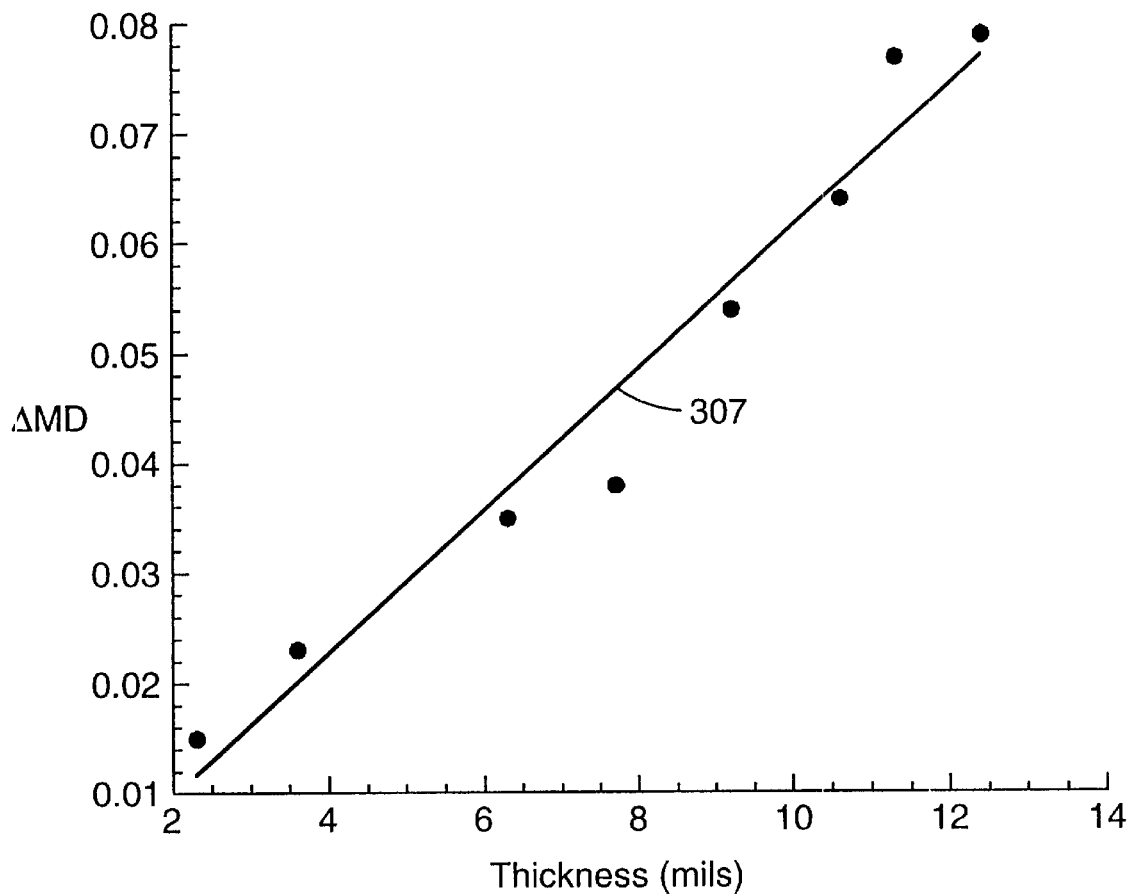

Curve 307 in FIG. 3C illustrates the change in modulation depth (ΔMD) as a function of diffuser thickness. The data points were measured in dark room to demonstrate performance of the screen in the absence of ambient light. It is noted that the change in modulation depth (ΔMD) decreases with decreasing diffuser thickness. The change in modulation depth generally results from the above-described absorption of light depolarized by the diffuser in the polarizing element. The change in modulation depth (ΔMD) increases with thickness in part because lateral scattering of light and depolarization thereof increases with increasing thickness.

Figure 3D:
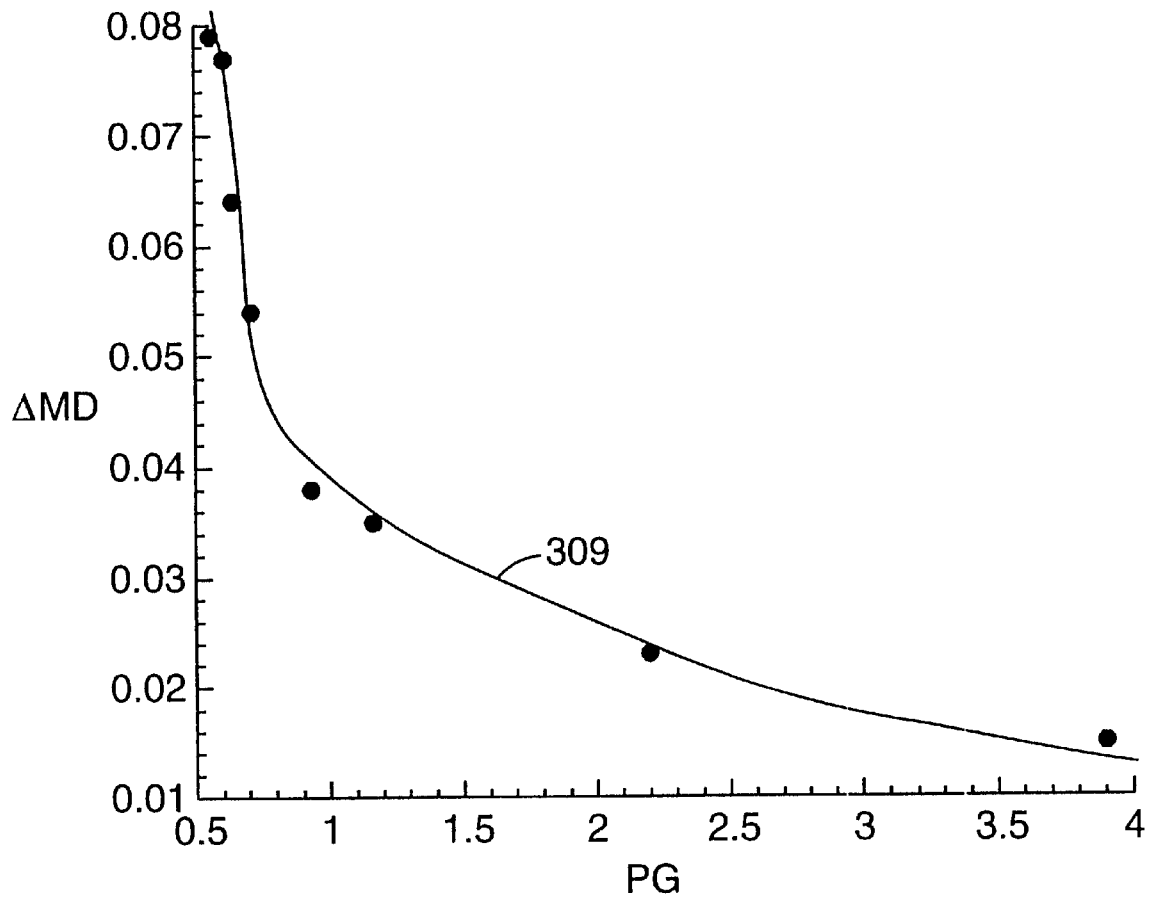

FIG. 3D illustrates a curve 309 of the change in modulation depth (ΔMD) as a function of peak gain as measured in the absence of ambient light. As would be expected from the above description, the change in modulation depth (ΔMD) reduces with increasing peak gain. This phenomenon can be understood due to the lower scattering in higher peak gain screen assemblies.

Figure 3E:
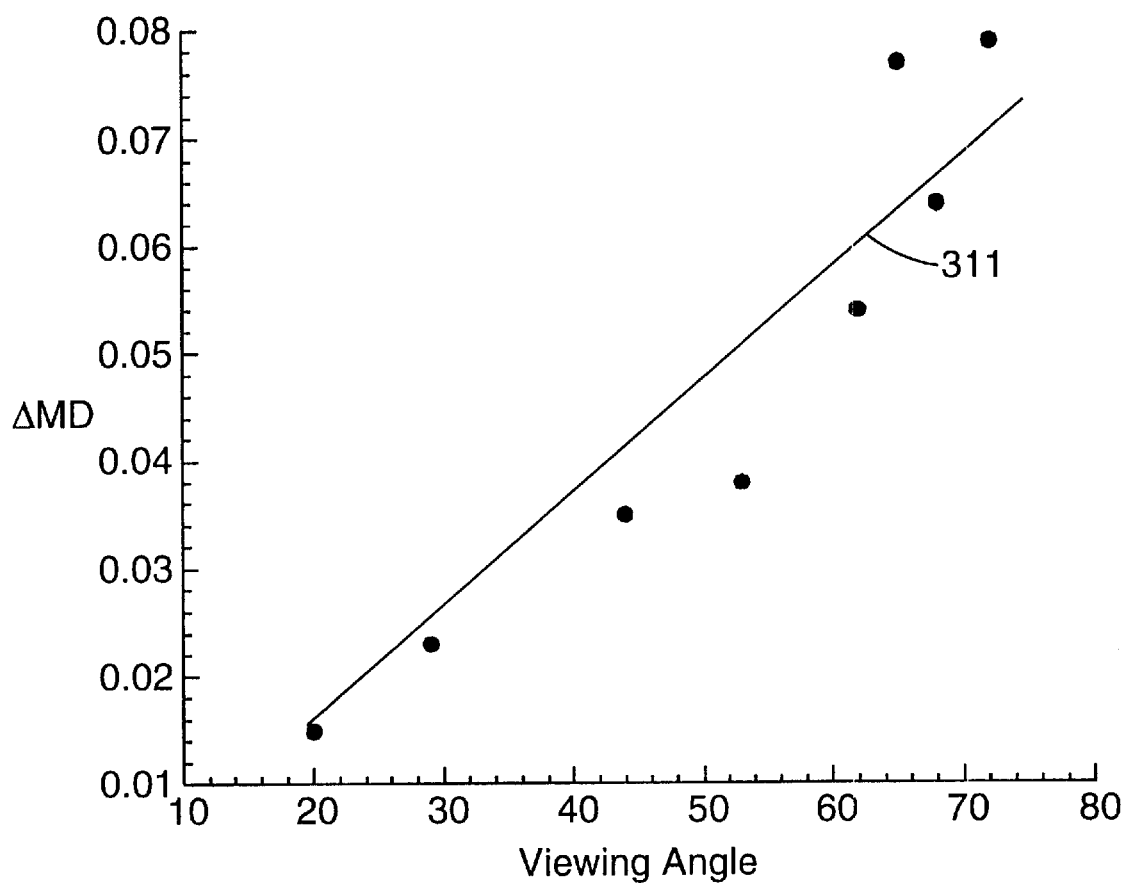
Figure 3F:
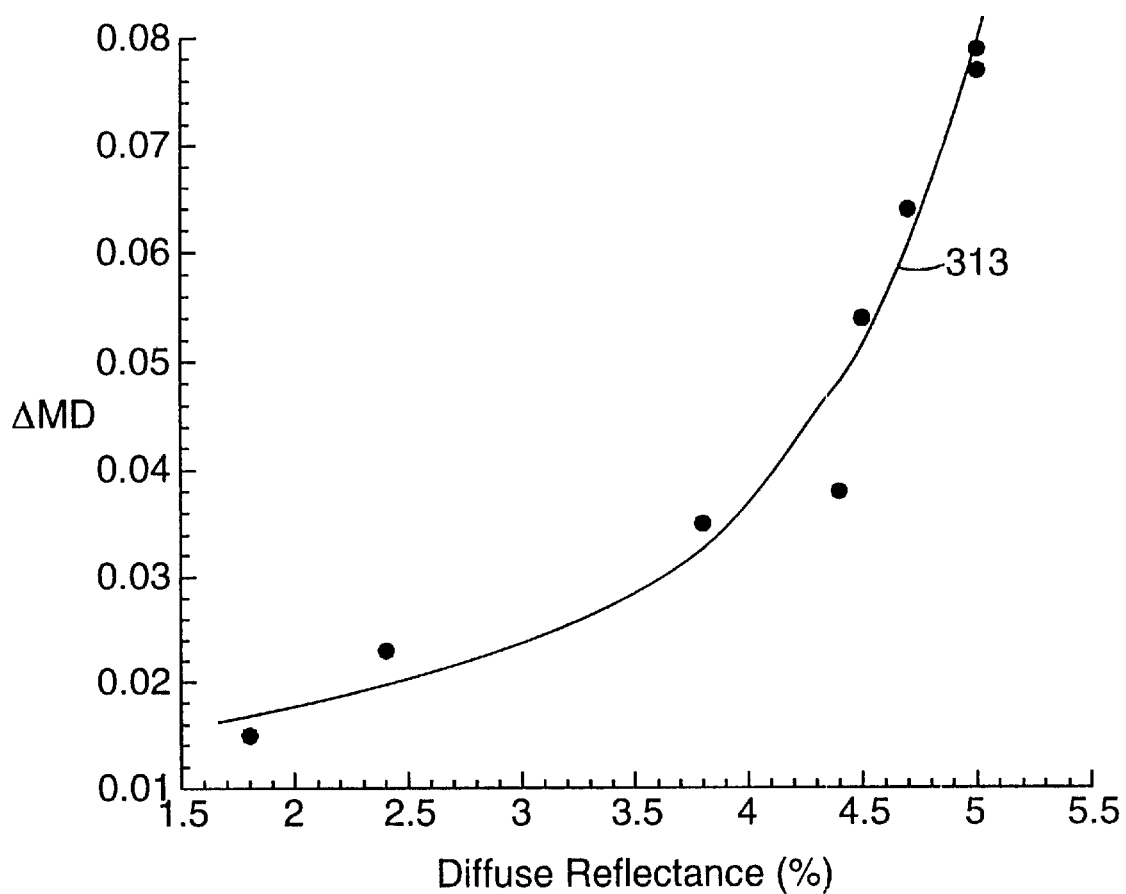

Curve 311 in FIG. 3E depicts the change in modulation depth (ΔMD) as a function of viewing angle. The data points were measured in the absence of ambient light. The change in modulation depth (ΔMD) increases as the viewing angle increases largely due to the increased scattering of the diffuser. In FIG. 3F, the change in modulation depth (ΔMD) as a function of diffuse reflectance from the screen assembly is depicted by curve 313. The data points were measured in the absence of ambient light. The change in modulation depth (ΔMD) increases with increasing diffuse reflectance because of the increased scattering of the diffuser.

Figure 4A:
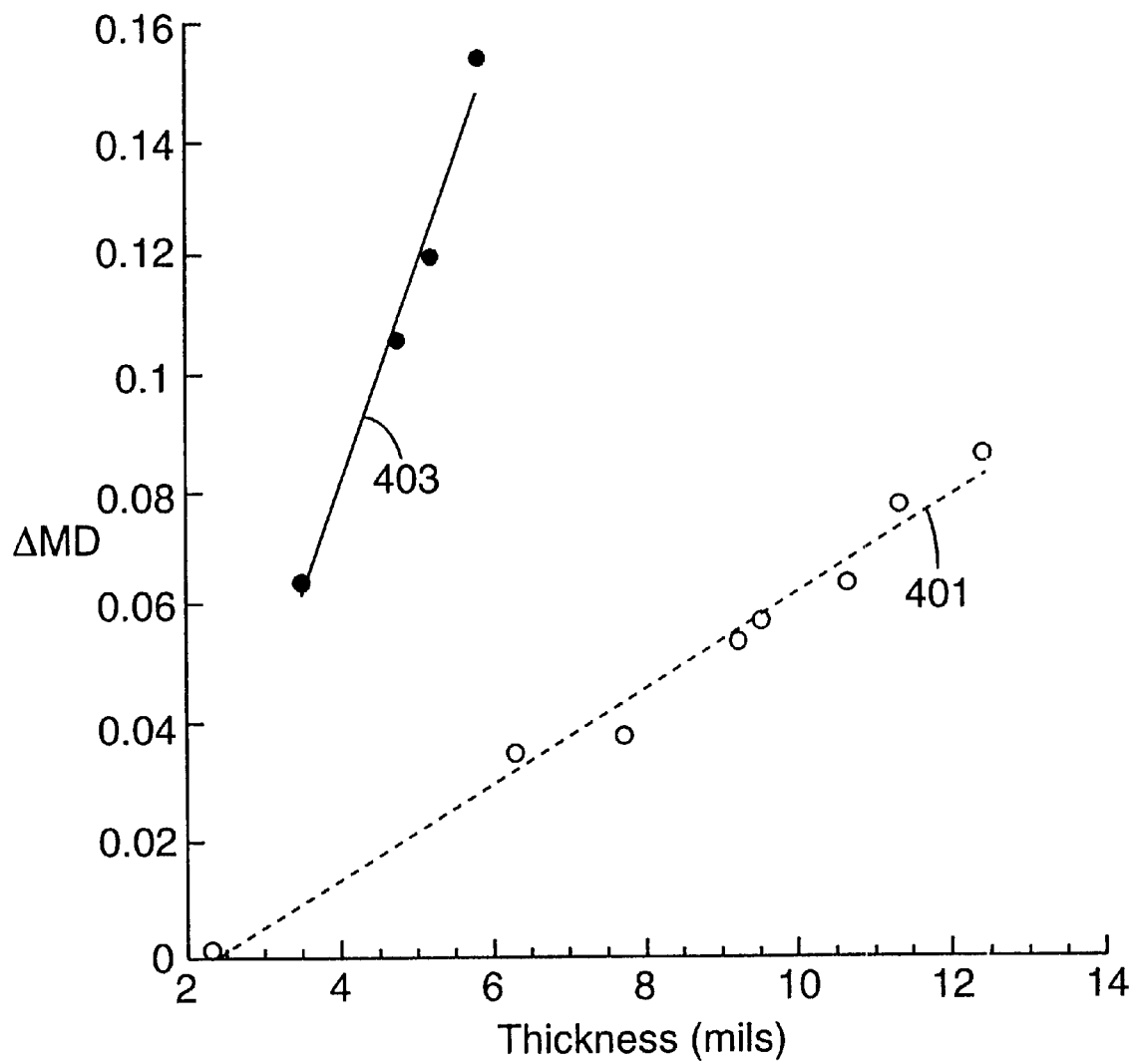
FIGS. 4A and 4B are graphs illustrating relationships between screen characteristics for different screen constructions.
Figure 4B:
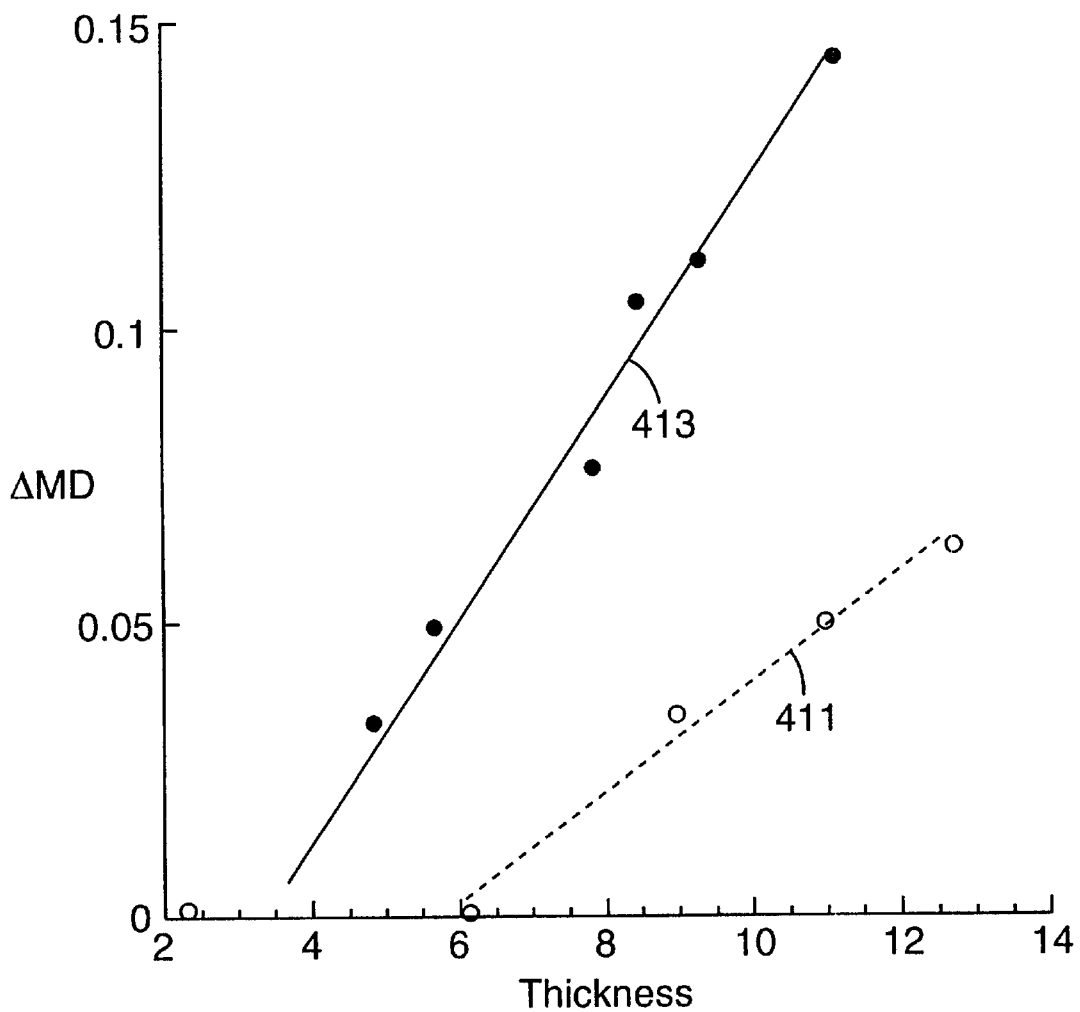

FIGS. 4A and 4B illustrate how the relationship between the change in modulation depth (ΔMD) and the screen thickness changes with different screen constructions. While the relationship is illustrated with respect to screen thickness, it will be appreciated that the overall trend applies to other relationships which correlate to screen thickness (e.g., viewing angle increases and gain decreases as the screen thickness increases, FIG. 3A). Curves 401 and 403 in FIG. 4A represent diffuser formulations where particles having a refractive index of 1.54 where dispersed in a binder having a refractive index of 1.48 at a loading of 33% and 40%, respectively. Curves 411 and 413 in FIG. 4B represent diffuser formulations where particles having a refractive index of 1.59 where dispersed in a binder having a refractive index of 1.48 at a loading of 10% and 20%, respectively.

The curves of FIGS. 4A and 4B demonstrate that the change in modulation depth (ΔMD) as a function of thickness is more pronounced as a diffuser formulation having a higher loading of particles is used. In certain instances the modulation depth may be impacted by a change to a higher loading in a manner which is at least compensated for by the addition of an absorbing polarizer. In other words, the greater change in modulation depth (ΔMD) resulting from use of a higher loading may at least offset any reduction in modulation depth otherwise associated with using higher loading. All other things being equal, it is often desirable to use a formulation having a higher loading to obtain the desired screen performance. This is because such formulations can typically be made thinner, using less material and can be coated at faster coating speeds and are easier to process. These factors tend to decrease the manufacturing costs of the diffuser element.

As noted above, one particular advantage of the present invention is increased resolution (e.g., modulation depth) obtained when combining an absorbing polarizer and diffuser in a screen assembly. Moreover, the increased resolution is obtained even in the absence of ambient light. While the use of the absorbing polarizer provides added advantages of absorbing ambient light to improve bright-room contrast, the present invention is not limited to those applications where the screen will be used in the presence of ambient light. The improvement in resolution becomes more pronounced as the thickness and/or particle loading if the diffuser is increased. The advantage of improved resolution is important to nearly all applications using projection screens (e.g., long and short viewing distance applications).

In accordance with one aspect of the invention, the performance of a screen can be tailored while taking advantage of the preferential depolarization of the laterally scattered light. One may first select a desired modulation depth for the overall screen assembly. A diffuser design may then be selected that meets the resolution requirements as well as other required characteristics of the screen assembly (e.g., viewing angle, contrast, etc.). The resolution of a screen assembly using the designed diffuser and an absorbing polarizer can then be ascertained to determine the amount the modulation depth will change. Relaxing the constraint of the lateral scattering (i.e., diffuser resolution) to a point where the complete screen assembly construction has the desired modulation depth can then be used to modify the diffuser design. This can be used to increase the screen performance in other characteristics. Such a screen typically exhibits better overall performance than a screen assembly in which the lateral scattering or blooming is minimized within the diffuser.

It will be appreciated that the diffuser design preferably substantially depolarizes light that degrades the projected image without substantially depolarizing light that does not degrade the resolution of the projected image. Thus, the diffuser generally should have a high extinction ratio (ER). The ER can be measured by placing the diffuser between parallel polarizers and crossed polarizers and measuring the transmitted intensity for each case. It is generally desirable to have an extinction ratio of at least 4 to 5. In certain instances it is desirable to have an extinction ratio of at least 5 to 10. In still other instances it is desirable to have an extinction ratio of at least 10 to 15 or higher. In such a screen, the amount by which the diffuser depolarizes laterally scattered light is reflected by the change in modulation depth (ΔMD) when a linear polarizer is added to the screen assembly.

As noted above, several of the screen characteristics work against each other. Depending on the screen application different characteristics may be optimized. In accordance with one aspect of present invention, screens can be made having better overall performance and/or at lower costs. For example for a short-viewing distance application, a screen can be made which has a viewing angle of at least about 50 to 80 degrees, has little or no color or speckle (e.g., scintillation of less than about 0–1), exhibits peak gain of at least about 0.45 to 0.9 with a dark room modulation depth of at least about 0.65 to 0.95. One screen assembly that is particularly suited for use in short viewing distance applications has a viewing angle of at least about 65 degrees, a peak gain of at least about 0.65, a modulation depth of at least about 0.90 in the absence of ambient light and exhibits at most slight scintillation.

In another embodiment, a screen can be made for a longer viewing distance. In such a screen some color and or speckle may be acceptable (e.g., scintillation of about 3 or less). Such a screen can be made to exhibit a peak gain of at least about 2 to 5 with a modulation depth of at least about 0.90 to 0.99. The viewing angle may be on the order of 15 to 30 degrees. In many long viewing distance applications, such as rear projection television, an additional lens structure may be added to provide different horizontal and vertical viewing angles (e.g., 30 to 50 degrees horizontal and 10 to 20 degrees vertical).

Figure 5:
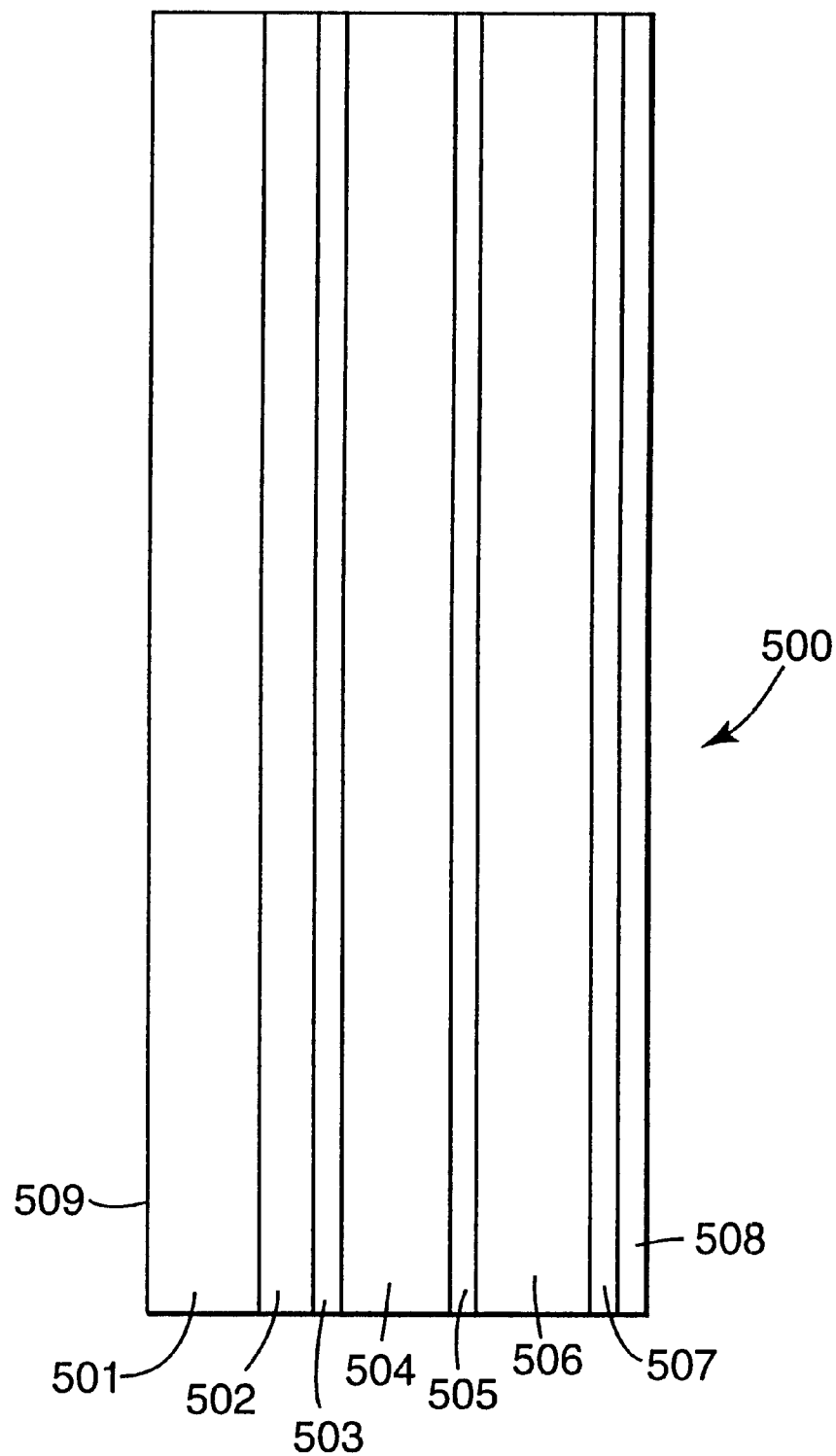
FIG. 5 illustrates a rear projection screen assembly in accordance with one embodiment of the invention.

FIG. 5 illustrates another screen assembly 500 in accordance with an embodiment of the present invention. The screen assembly 500 includes a diffusing element 501 coated on a diffuser substrate 502. A diffuser substrate 502 is adhered to a linear polarizer 504 via an optical adhesive 503. The linear polarizer 504 is adhered to a rigid, support substrate 506 via an optical adhesive 505. The support substrate 506 may optionally be treated with an AR coating 507 to reduce specular reflection from the surface of the substrate 506. The exterior surface (viewer side) may also be treated with an anti-smudge coating 508. It will be appreciated that various elements of the screen assembly 500 depicted in FIG. 5 are optional and may be eliminated. Moreover, other elements typically used in conventional screen assemblies or laminate constructions may be incorporated into the screen assembly.

The diffusing element 501 is of the type described herein and generally has a high degree of polarization preservation. The diffusing element 501 also preferentially depolarizes light that degrades the overall resolution of the image (e.g., laterally scattered light). The diffuser substrate 502 may be any substrate suitable to facilitate the manufacture of the diffuser. In one embodiment the diffuser is coated on the substrate as a resin and subsequently cured. A variety of substrates are suitable for such a process. It is also desirable that the diffuser substrate 502 exhibit low birefringence so as to not alter the polarization state of light as it passes through the diffuser substrate 502. Suitable substrates include isotropic polycarbonate, cellulose triacetate (CTA), polymethylmethacrylate (PMMA), polyarylate, acrylic, cellulose acetate butyrate (CAB), glass and the like.

The adhesive 503 and 505 used to laminate the parts together should generally have high optical performance, and be free from polarization-altering characteristics. It is also desirable to have the refractive indices of the adhesives in the general range of the elements adhered using the adhesive.

The polarizer 504 is an absorbing polarizer. One function of the polarizer is to absorb ambient light incident upon the screen assembly 500 from the viewer side of the screen. A second function of the polarizer is to absorb the preferentially depolarized light in order to improve the overall screen resolution and performance. Any of a number of commercially available linear polarizers may be used as the polarizer 504. It is typically desirable to use an absorbing polarizer 504 that has a relatively high transmission for light polarized in the pass direction so as to not significantly degrade the overall transmission of the screen assembly. While higher transmission comes at the expense of polarizer contrast a relatively low-contrast polarizer may be acceptable in certain applications to obtain higher pass-state transmission because the absorbing polarizer 504 is not used to analyze light of different polarization states.

The support structure 506 provides, among other things, structural stability to the screen assembly 500. A variety of substrates may be used to provide structural stability including rigid polymeric optical sheets (e.g., polycarbonate, plastic, etc.), glass sheets and the like. The rigid support substrate may be clear or have some absorption characteristics incorporated into the substrate. For example, the substrate may have a neutral density or other spectral absorption characteristics. An anti-reflection (AR) coated glass or other rigid substrate, for example, may be used as the rigid support 506. An anti-smudge layer, if used, may be of a variety of coatings commercially available. One particularly suited anti-smudge layer is described in co-pending U.S. patent application Ser. No. 08/902,666, entitled Antisoiling Coatings for Antireflective Surface and Methods of Preparation, filed Jul. 30, 1997 and Ser. No. 09/014,341 entitled Antisoiling Coating for Antireflective Surface and Methods of Preparation, filed Jan. 27, 1998, commonly assigned to the assignee of the present invention, the contents of which are incorporated herein by reference.

Figure 6:
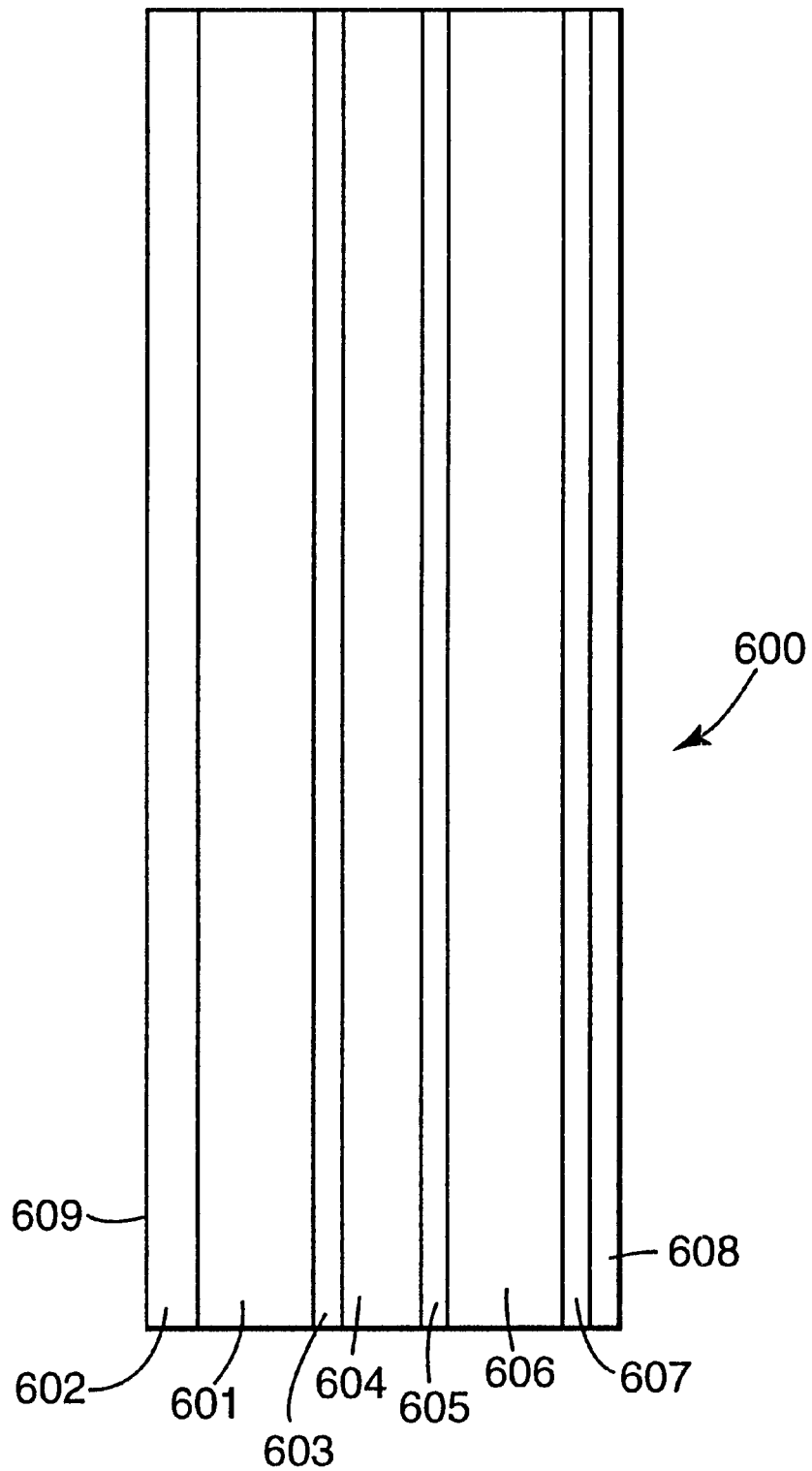
FIG. 6 illustrates a rear projection screen assembly in accordance with another embodiment of the invention.

FIG. 6 illustrates another screen assembly in accordance with an embodiment of the present invention. In FIG. 6, the absorbing polarizer 604, rigid support structure 606, adhesive layers 603 and 605, AR coating 607 and anti-smudge 608 layers are similar to those described above. A diffusing element 601 is laminated directly to the linear polarizer 604 via the optical adhesive 603. In this case, a diffuser substrate 602 faces the projection side of the screen assembly (i.e., the side of the screen assembly onto which the image is projected). In comparison with FIG. 5, the positioning of the diffusing element 601 and the diffuser substrate 602 are reversed.

In each of the embodiments illustrated in FIGS. 5 and 6, it may be desirable that the surface onto which an image is projected be treated to reduce specular surface reflections. In one embodiment, the rear surface of the diffuser 501 (FIG. 5) or diffuser substrate 602 (FIG. 6) has been treated to have a matte texture. The matte surface tends to reduce specular reflection. In one embodiment, an AR coating may be applied to the surface as an alternative or additional way to reduce specular reflections of the image projected onto the screen assembly.

Figure 7:
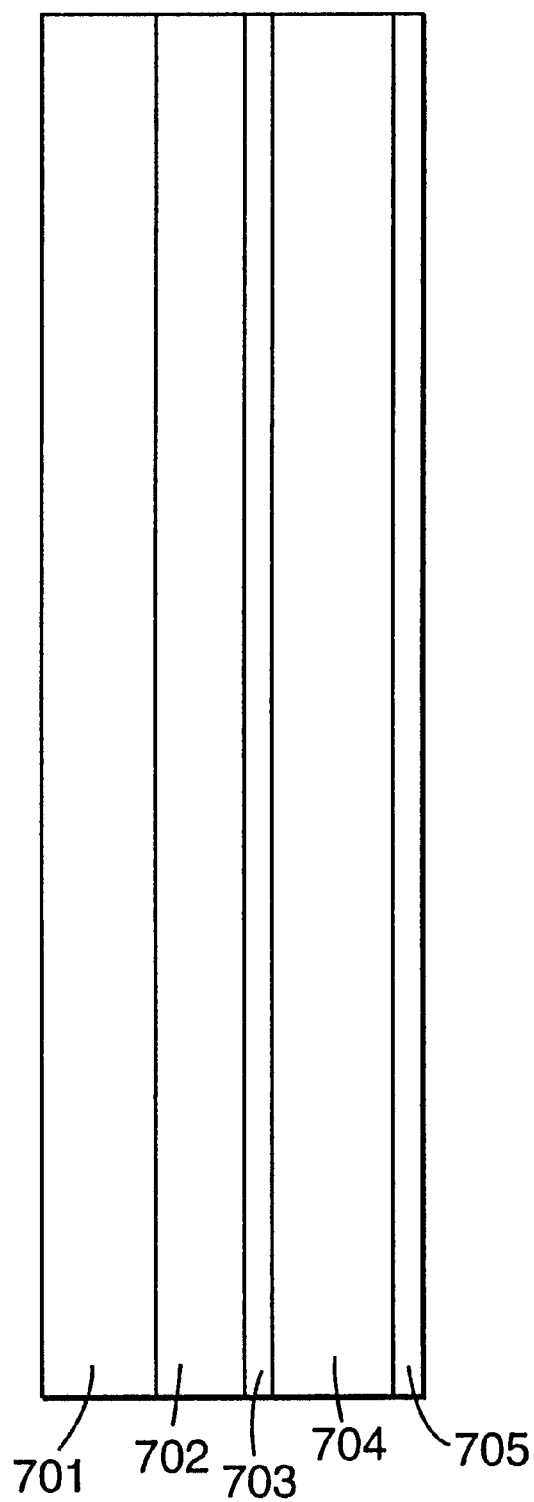
FIG. 7 illustrates still another rear projection screen assembly in accordance with an embodiment of the invention.

Still another embodiment of a screen assembly is depicted in FIG. 7. The screen assembly in FIG. 7 includes a diffuser 701 that is coated on a substrate and subsequently cured. In one such embodiment, the diffuser 701 is coated directly onto an absorbing polarizer 702 (e.g., a linear polarizer) and subsequently cured. In this fashion, the absorbing polarizer 702 also functions as a diffuser substrate. The polarizer may be laminated to other elements of a screen assembly (e.g., a rigid support 704 via adhesive 703) as described above. The rigid support structure 704 may have an AR coating 705 on the viewer side surface thereof as well as elements such as the ones described above.

One particular advantage of the screen assembly depicted in FIG. 7 is the elimination of a separate diffuser substrate for the diffuser 701. Elimination of the separate diffuser substrate eliminates any degradation in performance due to, for example, birefringence of the diffuser substrate. In an alternative embodiment, the structure depicted in FIG. 7 may be made by first coating the diffuser 701 onto a transfer substrate (not shown) and curing the diffuser 701. The side of the cured diffuser 701 opposite the transfer substrate may then be laminated to the polarizing element 702 via an adhesive (not shown). Upon removal of the transfer substrate a screen assembly which does not incorporate a separate diffuser substrate is obtained. The transfer substrate may have a structured surface (e.g., a microstructured embossed surface) on which the diffuser is formed. The structured surface imparts a matte finish or other microstructured surface to the diffuser upon removal of the transfer substrate.

Figure 8:
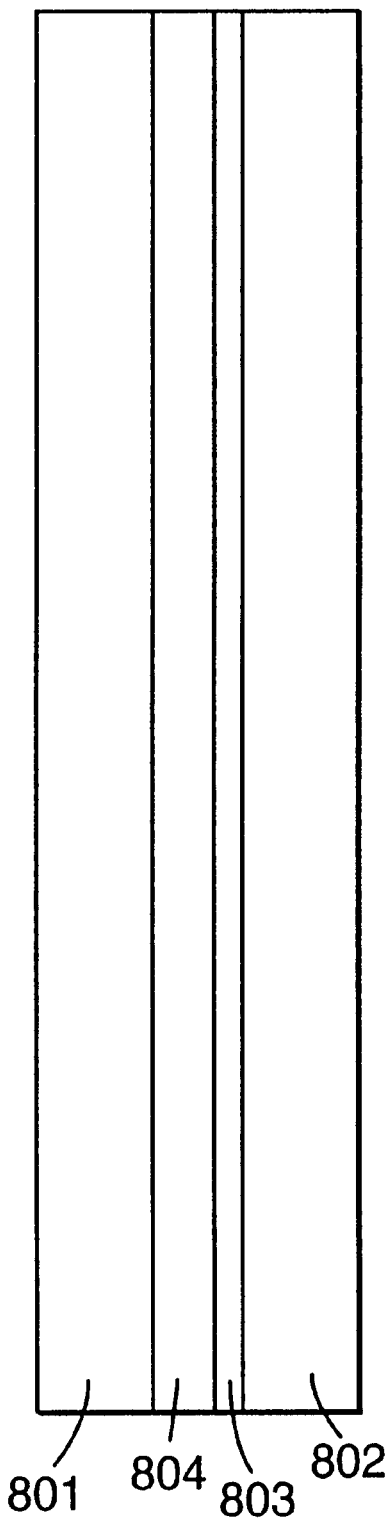
FIG. 8 illustrates a rear projection screen assembly in accordance with another embodiment of the invention.

Still another embodiment of the invention is illustrated in FIG. 8. A diffusing element 801 is laminated to an absorbing polarizer 802 via a diffuse adhesive 803. The diffuse adhesive 803 provides additional diffusion thereby permitting the thickness of the diffusing element to be reduced while obtaining the same overall level of diffusion. This permits reduction in the thickness of the complete screen assembly. It will be appreciated that while other optional elements of a screen assembly are not illustrated in FIG. 8, they may also be provided as desired for the purposes described above. In FIG. 8, the diffusing element 801 includes a diffuser substrate 804. It will be appreciated that a screen assembly that does not have a separate diffuser substrate can be made in the manner described in connection with FIG. 7. The diffuse adhesive can be used to affix the diffusing element 801 to the polarizer 802. When a diffuse adhesive 803 is used, its diffusion characteristics should be comparable to those of the diffusing element 801. For example, the diffuser adhesive 803 should not substantially depolarize light. One such diffuse adhesive is described in published PCT Patent Application WO 97/01610, entitled Light Diffusing Adhesive, the contents of which are incorporated herein by reference.

Figure 9:
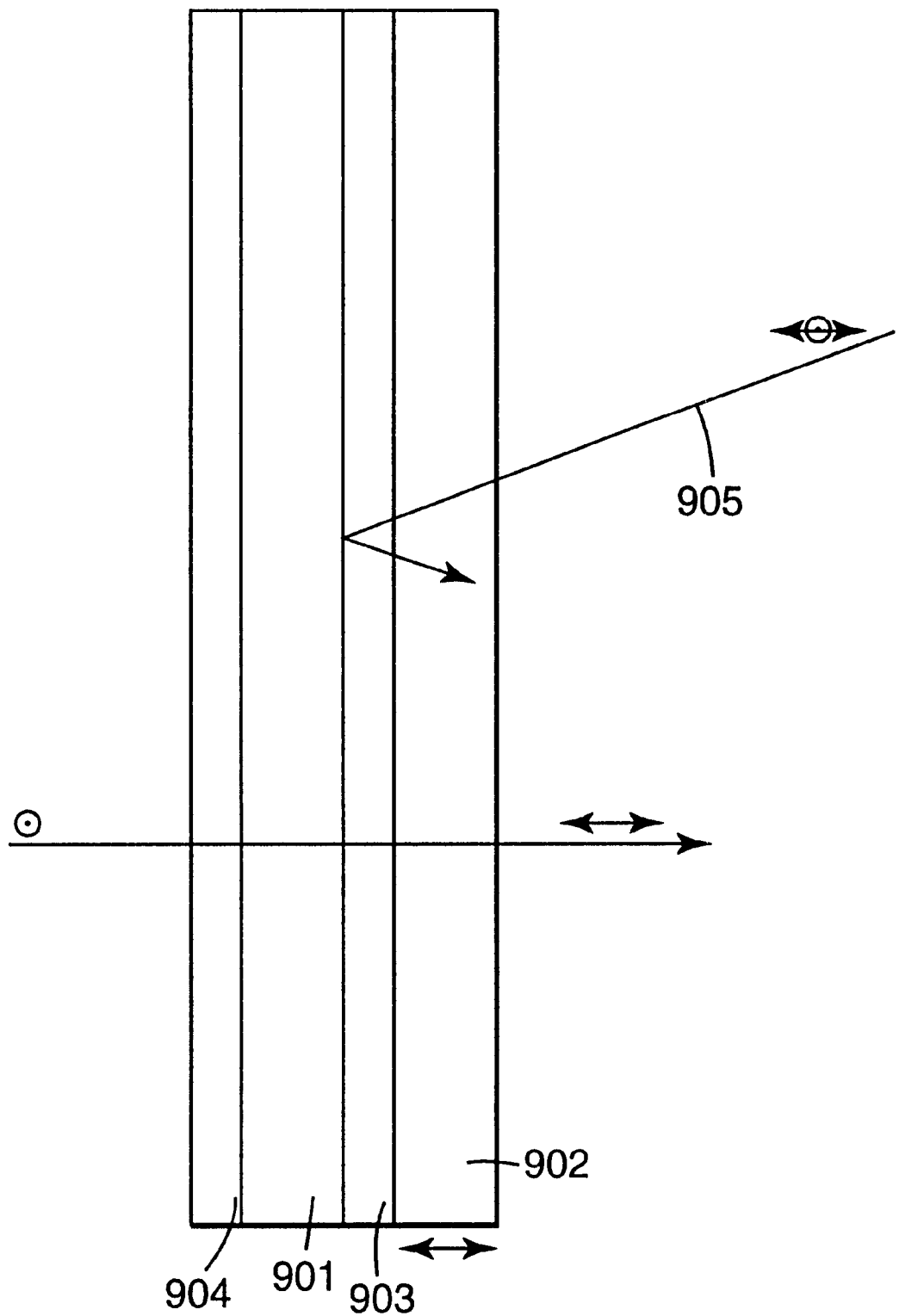
FIG. 9 illustrates a rear projection screen assembly in accordance with still another embodiment of the invention.

In FIG. 9, a screen assembly in accordance with another embodiment of the invention is illustrated. The screen assembly includes a diffusing element 901 and an absorbing linear polarizer 902. Interspersed between the polarizer 902 and the diffusing element 901 is a ¼-wave retarder 903. A second ¼-wave retarder 904 is disposed on the opposite side of the diffusing element. The parts can be laminated together using an adhesive (not shown). While FIG. 9 does not show additional screen elements, such elements may be provided in conjunction with the screen elements depicted. It is also noted that a diffuser substrate not shown. While a substrate could be used, in one embodiment the diffusing element 901 may be coated directly onto one of the ¼-wave retarder films 903, 904 which would then also function as the diffuser substrate.

The ¼-wave retarder films are provided to enhance ambient light rejection. This may be understood by examination of ambient light ray 905. The ambient light includes both transmission and absorption polarization states relative to the polarizer 902. As the ambient light transmits through the polarizer 902, light of the absorption polarization state will be absorbed. The ¼-wave retarder 903 rotates the polarization state of light which transmits through the retarder and is reflected back towards the viewer side of the screen assembly by 90°. The polarizer 902 then absorbs the rotated light. In such a system, the amount of ambient light that is absorbed by the polarizer 902 is significantly increased.

The second ¼-wave retarder film 904 is provided to align the polarization state of the light carrying the image projected onto the rear of the projection screen with the pass direction of the polarizer 902. As will be appreciated, such light will be projected in a state that corresponds to the block state of the polarizer 902. As the light passes through the two ¼-wave retarders 903 and 904, the polarization state of the light is rotated by 90° so as to correspond to the pass direction of the polarizer 902. Since laterally scattered circularly polarized light which passes through the diffusing element 901 will also be preferentially depolarized, the above described advantages of the combined diffusing element 901 and polarizer 902 will be obtained in the screen assembly of FIG. 9. Thus, the screen assembly has improved ambient light rejection while still maintaining the advantageous screen characteristics (e.g., high modulation depth) obtainable in accordance with an aspect of the present invention.

As noted above, the present invention can be used to manufacture a variety of different screen assemblies for different applications. The following Table II lists a number of different screen assemblies made in accordance with the present invention designed for different applications (e.g., TV, data monitor, etc.) and their performance characteristics. The construction of the diffuser used in the screen assembly is described in terms of the binder resin and index of refraction (Resin, Index), nominal particle size and index of refraction (Particle Size, Index), the loading percentage of the particle in the binder (Loading %) and the diffusing element thickness (D). The resin designation 220 is a composition of the type described below in connection with Example 1. The listed characteristics include a rating for scintillation (Scint.), a measure of the extinction ratio of the diffuser (Diff ER), the peak gain (PG), the viewing angle (VA), the percentage of diffuse reflection (DR) and the modulation depth in a dark room (MD Dark) and with 250 Lux ambient light (MD 250). The modulation depth listed was measured using an ICC with a spatial frequency of 1.6 lines/mm. It should be appreciated that other spatial frequencies could be used to characterize performance depending on the particular application.

TABLE II

| Application | Resin/Index | Particle, Index | Loading (%) | D (μm) | Scint | Diff ER | PG | VA | DR (%) | MD Dark | MD 250 |
|---|---|---|---|---|---|---|---|---|---|---|---|
| Desktop Monitor | 220, 1.48 | 5 μm, 1.54 | 40 | 142.1 | 0 | 4.2 | 0.46 | 80 | 5.5 | 0.877 | 0.818 |
| Desktop Monitor | 220, 1.48 | 5 μm, 1.54 | 33 | 238.9 | 0.5 | 7.5 | 0.68 | 65 | 4.9 | 0.927 | 0.863 |
| TV, Professional | 220, 1.48 | 5 μm, 1.54 | 33 | 88.2 | 3 | 70.9 | 2.2 | 29 | 2.4 | 1 | 0.978 |
| TV, Consumer | 220, 1.48 | 5 μm, 1.59 | 20 | 46.55 | 3 | 123 | 5.2 | 13 | 2 | 0.989 | 0.955 |
| TV, Professional | 220, 1.48 | 5 μm, 1.59 | 20 | 80.85 | 3 | 52.1 | 1.91 | 27 | 1.91 | 0.996 | 0.936 |
| Desktop Monitor | 220, 1.48 | 5 μm, 1.59 | 20 | 183.8 | 0 | 6.6 | 0.59 | 65 | 5 | 0.913 | 0.843 |
| Desktop Monitor | 220, 1.48 | 5 μm, 1.59 | 10 | 379.8 | 0 | 6.4 | 0.57 | 75 | 5.6 | 0.79 | 0.74 |
| Desktop Monitor | 220, 1.48 | 5 μm, 1.54 | 10 | 600.3 | 0 | 21.6 | 0.89 | 52 | 4.1 | 0.788 | 0.733 |
| Desktop Monitor | 220, 1.48 | 5 μm, 1.54 | 10 | 710.5 | 0 | 12.2 | 0.72 | 65 | 4.6 | 0.673 | 0.638 |

A number of additional examples are provided below which depict screen assemblies using various diffuser formulations. Some of the screen characteristics of screen assemblies using such formulations are also provided. These various examples demonstrate the manner in which overall screen performance can be improved by relaxing the constraint on lateral scattering within the diffusing element. Relatively high resolution (e.g., MD) is maintained in the various screen assemblies.

Example 1

Example 1 illustrates a diffusing element in accordance with one embodiment of the invention and the corresponding increase in modulation depth that is obtained by combination with a linear polarizer. In the example of FIG. 1, a binder was made as a composition of equal weights of three resin components, SR9003, SR335 and CN966H90, available from Sartomer Company, Exton, Pa. plus a photoinitiator (Darocur 4265, available from Ciba-Geigy Co., Tarrytwon, N.Y.) @2 wt % loading relative to the total resin mass. The refractive index of the above-described resin was approximately 1.48. Particles having an index of refraction of 1.54 comprised of copolymers of polystyrene and ethylmethacrylate were dispersed within the resin binder. Particles of the type described having various refractive indices are available from Nagase American Corp., New York, N.Y. The above mixture was coated onto a polycarbonate substrate to a thickness of approximately 240 $\mu$m (9.75 mils). The diffusing element alone had a peak gain of approximately 0.88, a viewing angle of approximately 73° and a diffuse reflectance of approximately 29.4%. The modulation depth of the diffuser in a dark room was measured at 0.86. The above diffuser was subsequently laminated to a linear polarizer. Upon lamination to a linear polarizer, the modulation depth of the screen assembly increased to 0.927.

Example 2

In another embodiment of the invention was made using the mixture described in Example 1. In this case, the mixture was coated directly onto the linear polarizer and cured. The resulting screen assembly had comparable performance to that described above with a similar modulation depth increase.

Example 3

In Example 3, the substrate was eliminated by use of a transfer substrate. The transfer substrate was GE8B35 available from General Electric and included a strong matte finish. A diffuser formulation of a type similar to that described in Example 1 was coated on the matte side of a transfer substrate that was coated with 2% (in IPA) R22754 silicone polyurea solution available from 3M Company, St. Paul, Minn. The silicon polyurethane solution exhibits a low surface energy and was dried at 70° C. prior to coating the diffuser. After the diffuser was coated on the matte side of the substrate and cured, the combination was laminated to a linear polarizer and a glass support substrate with the diffuser side down. After lamination, the transfer substrate was removed. Upon removal of the matte transfer substrate, a matte finish remained on the diffuser element. The matte surface demonstrated a reduced specular reflection off of the diffusing element. The overall screen characteristics of the diffuser were comparable to that described in connection with Example 1.

Example 4

Example 4 used the formulation of Example 1 coated directly on a polycarbonate substrate and cured to a thickness of approximately 172 $\mu$m (7 mils). Subsequent to curing, the combination diffuser/polycarbonate substrate was laminated to glass using a diffuse adhesive of the type described above. The diffuse adhesive increased the overall viewing angle. In this manner, a screen assembly having a viewing angle comparable to that of a thicker diffuser was obtained by use of the diffuse adhesive to provide additional diffusion.

Example 5

Example 5 illustrates the manner in which a linear polarizer and a diffuser which preferentially depolarizes laterally scattered light can be combined to reduce color and speckle without significantly adversely affecting the resolution of the screen assembly. A diffusing element was made using a 33% particle loading in the resin described in Example 1. The diffuser was coated to a thickness of approximately 232.5 microns (9.3 mils) on a polycarbonate substrate and UV cured. The diffuser had a scintillation rating of approximately 0.5 (slight) and a modulation depth of 0.87. In order to reduce the scintillation rating to zero, a second diffuser was made by increasing the coating thickness to 290 microns (11.6 mils). In the above example, the modulation depth of the diffuser alone dropped from 0.87 to 0.81. However, when the screen assembly was laminated to a linear polarizer that absorbed the laterally scattered light, the modulation depth of the overall screen assembly increased to 0.86.

Example 6

Example 6 illustrates the manner in which the diffusing element may be modified by reducing thickness without changing the viewing angle and resolution. As noted above, reduction in thickness typically results in lower manufacturing costs. In Example 6, a first diffuser was constructed with a 33% particle loading and a thickness of 282.5 microns (11.3 mils). The diffuser was coated on a polycarbonate substrate. This diffuser was laminated to a linear polarizer resulting in a screen assembly having a viewing angle of 74° with a modulation depth of about 0.90. A second diffusing element was made with an increased particle loading of 40%. By using a thinner diffuser, the amount of raw material used is reduced, the manufacturing process becomes easier, and the amount of time required for coating decreases. The higher loading diffuser had a viewing angle of 75° at a coating thickness of approximately 130 microns (5.2 mils). The modulation depth of the diffuser alone dropped when compared to the thicker diffuser to approximately 0.78 from approximately 0.82. However, when the thinner diffuser was laminated to a linear polarizer, the modulation depth increased to 0.90 (i.e., a modulation depth equivalent to that of the screen assembly using the thicker diffuser).

Example 7

Example 7 illustrates the manner in which a relatively wide viewing angle screen assembly can be obtained which also exhibits high resolution. In this example, a first diffuser was coated on a polycarbonate substrate with a particle loading of 20% and 1.59 particle refractive index. The thickness of the coated diffuser was approximately 187.5 microns (7.5 mils). The viewing angle of the diffuser, laminated to a linear polarizer, was approximately 65° with a modulation depth of 0.91. A second diffuser was made and designed to have a viewing angle of approximately 80°. The thickness of the second diffuser was coated at 265 microns (10.6 mils). While the modulation depth of the diffuser alone dropped to 0.64 from approximately 0.81 (a difference of approximately 0.17), when laminated to a polarizer the overall modulation depth remained relatively high (0.79) for a screen having such a large viewing angle. It is important to note that the difference (0.12) between the modulation depth (0.91) of the 65° screen assembly (with polarizer) and the modulation depth (0.79) of the 80° screen assembly (with polarizer) was smaller than the difference in modulation depth (0.17) between the diffuser samples alone. It will be appreciated that by use of the present invention a higher viewing angle screen can be obtained which has relatively high resolution (e.g., modulation depth).

In the above examples particular binder resins and particles were used. It should be appreciated that other types of binders and particles can be used in accordance with other embodiments of the invention. For example, the above-resins can be used in different ratios to obtain different binder properties. Other suitable binder materials include acrylates, methacrylates, epoxy acrylates, polyesters and the like, as well as combinations of the different materials. Other particles can also be used in combination with the various binders. Suitable particles include organic and inorganic matter and can be either irregular or spherical shapes. As noted above, diffusers having particles that are spherical tend to have better overall polarization preserving properties. Specific examples include beads made of calcium carbonate, silica, polystyrene, PM, teflon, zirconium silicate, magnesium oxide, polyethylene, silica, aluminum oxide, aluminum hydroxide, calcium carbonate, zirconim oxide, titanium oxide, barium sulfate, aluminum silicate, hollow glass, clay, other polymeric beads and the like.

While the present invention has been described above with reference to various embodiments and examples, it should not be limited to the specifics of the embodiments and examples. Rather, the intention is to fully cover the invention as set out in the attached claims.

What is claimed is:

1. A projection screen assembly for displaying a projected image, comprising:
   a diffuser including particles dispersed within a binder, the particles and the binder having different refractive indices, the diffuser diffusing light of the projected image having an initial polarization state incident on and transmitted through the diffuser to a cone of angles while substantially preserving the initial polarization state of the diffused light, the diffuser further at least partially depolarizes a portion of the light of the projected image that is laterally scattered in the diffuser such that the laterally scattered light is transmitted through the diffuser with a component of light having a different polarization state than the initial polarization state; and
   a polarizer disposed to receive light transmitted through the diffuser, the polarizer substantially transmitting light of the initial polarization state and substantially absorbing light of the different polarization state.

2. A projection screen assembly as recited in claim 1, wherein light transmitted through the diffuser exhibits slight or no scintillation.

3. A projection screen assembly as recited in claim 1, further comprising a diffuser substrate.

4. A projection screen assembly as recited in claim 3, wherein the diffuser substrate substantially maintains the polarization state of light as it passes through the substrate.

5. A projection screen assembly as recited in claim 1, wherein the cone of angles comprises a viewing angle of at least 30 degrees.

6. A projection screen assembly as recited in claim 1, wherein the diffuser has substantially no speckle.

7. A projection screen assembly as recited in claim 1, wherein the diffuser has a peak gain of at least 0.5.

8. A projection screen assembly comprising:
   a diffuser having particles dispersed in a binder, a refractive index of the particles being different from a refractive index of the binder; and
   a polarizer disposed to receive light transmitted through and diffused by the diffuser, a modulation depth of the diffuser being less than a modulation depth of the screen assembly.

9. A projection screen assembly as recited in claim 8, wherein a modulation depth difference between the modulation depth of the diffuser and the modulation depth of the screen assembly is at least about 0.04.

10. A projection screen assembly as recited in claim 9, wherein the modulation depth difference is at least about 0.05.

11. A projection screen assembly as recited in claim 9, wherein the modulation depth difference is at least about 0.10.

12. A projection screen assembly as recited in claim 9, wherein the modulation depth difference is at least about 0.15.

13. A projection screen assembly as recited in claim 9, wherein the modulation depth of the screen assembly is at least about 0.9.

14. A projection screen assembly comprising:
   a diffuser having particles dispersed in a binder, a refractive index of the particles being different from a refractive index of the binder; and
   a polarizer disposed to receive light transmitted through and diffused by the diffuser, wherein the screen assembly has a peak gain of at least about 0.5, exhibits slight or no scintillation, diffuses light to a viewing angle of at least 50 degrees and has a modulation depth of at least about 0.80.

15. A projection screen assembly comprising:
   a diffuser having particles dispersed in a binder;
   a polarizer laminated to the diffuser;
   a rigid sheet laminated to the polarizer, the rigid sheet being on a viewer side of the screen assembly; and
   an anti-reflective coating disposed on a side of the rigid sheet opposite the polarizer, wherein the screen assembly has a viewing angle of at least about 65 degrees, a peak gain of at least about 0.65 and a modulation depth of at least about 0.90, the screen assembly having at most only slight observable scintillation.

16. A projection system comprising:
   a projector projecting a polarized image comprised of a plurality of pixels;
   a bulk diffusing element disposed to receive the projected image and to diffuse the image to a prescribed viewing angle, the diffusing element maintaining a polarization state of light corresponding to a projected pixel of the image that is transmitted through the diffuser at a location corresponding to the projected pixel to a greater extent than light corresponding to the projected pixel that is laterally scattered by the diffuser to a location corresponding to a different pixel; and
   an absorbing polarizer disposed to receive light transmitted through the diffuser and being oriented to pass light of a polarization state corresponding to the light of the projected pixel transmitted through the diffuser at the location corresponding to the projected pixel.

* * * * *